July 10, 1945.  L. A. JONES ET AL  2,380,244
SENSITOMETRY
Filed Nov. 19, 1942  2 Sheets-Sheet 1

LOYD A. JONES
CLARENCE N. NELSON
LAWRENCE D. CLARK
INVENTORS

BY
ATT'Y & AGT

LOYD A. JONES
CLARENCE N. NELSON
LAWRENCE D. CLARK
INVENTORS

Patented July 10, 1945

2,380,244

UNITED STATES PATENT OFFICE 2,380,244

SENSITOMETRY

Loyd A. Jones, Clarence N. Nelson, and Lawrence D. Clark, Rochester, N. Y., assignors to Eastman Kodak Company Rochester, N. Y., a corporation of New Jersey Application November 19, 1942, Serial No. 466,114

16 Claims. (Cl. 95—10)

This invention relates to sensitometer tablets.

In sensitometry, a photosensitive material such as photographic film or paper is given an accurately controlled exposure and is processed to a finished sample usually called a sensitometric strip. A sensitometer is the instrument for giving this controlled exposure and thus is not, strictly speaking, a meter. Sensitometers of the variable intensity, constant exposure time, type sometimes employ stepped density light filters which are the tablets to which the present invention refers. They may be used in simple contact or projection printers or may be incorporated into relatively elaborate sensitometers. The invention relates to all forms of such tablets.

How the data obtained by densitometer measurements of a sensitometric strip leads to the characteristic (Hurter and Driffield) curve is very well known. All sensitometric properties can be defined and correlated in terms of this curve. Such properties include speed or sensitivity, contrast, exposure scale, fog density, maximum density, etc. The present invention concerns primarily the measurement of exposure scale and also the measurement of speed. Both the minimum and the maximum useful densities are involved but neither one is specifically measured. Those skilled in this art sometimes use the term "range" but since this has various meanings, we here use the more exact term "exposure scale" referring in general to the ratio of two exposure values which correspond to some point on the characteristic curve.

Sensitivity or speed measurements of all types are fundamentally the determination of the exposure required to give a specified density or gradient or some characteristic combining both. Various conventions or systems have been adopted or at least suggested based on inertia, on fixed density, on minimum useful density, on minimum useful gradient, on fractional gradient (see Journal of Optical Society of America, January 1941, p. 87) or on maximum useful density, the latter term itself being definable in various ways. The present invention is useful with only certain of the conventions but it happens that these are the ones of more universal and practical use. It is particularly related to speed measurement in terms of gradient. Since the early writers who referred to "useful density" really were basing their judgment of utility on the gradient, the present invention is directly applicable to such early systems.

Similarly in the measurement of exposure scale, the present invention is most useful in determining the useful exposure scale between minimum and maximum useful densities which are determined by the minimum useful gradients near the two ends of the characteristic curve rather than total available scale or the "latitude" as restricted to the straight line portion of the characteristic curve.

The primary object of the invention is to provide a sensitometer tablet capable of producing a sensitometric strip from which the exact useful exposure scale may be determined by direct visual examination.

Another important object of the invention involves the measurement of speed by the same direct visual examination of the resulting strip.

One embodiment of the invention is particularly useful for determining the useful exposure scale and speed of photographic paper. One advantage of this embodiment is that it is convenient to use for testing just before making regular prints.

It is the object of a preferred embodiment to permit the useful exposure scale to be determined even when the exposure is not controlled accurately enough for speed determinations.

Two other preferred features are incorporated in a form of tablet particularly suitable for use in a projection printer.

By using such a tablet in the particular printer with which prints are to be made the printer constants such as light intensity are the same during the test and during the actual printing from negatives. An alternate method is to measure the changes in the constants and make proper compensation by altering the printing exposure.

According to the present invention, the above objects are obtained by a sensitometer tablet comprising density steps ranging from high densities to low densities, each density area of the high density group being adjacent to one differing therefrom by a small density increment which is constant from step to step and similarly each density area in the low density group being adjacent to one differing therefrom by an increment which is constant from step to step and is the same or preferably different from the constant for the high density group. The toe and shoulder of the material being tested are of course exposed respectively through the high and low density groups of steps. For measuring the useful exposure scale and speed, we find that it is preferable to have the density increment approximately equal to .06 for the high density group and approximately equal to .02 for the low density group.

These particular values give sensitometric determinations in terms of a minimum useful gradient of approximately .01 (i. e. a minimum useful density just slightly above fog density) and a maximum useful density at the point on the shoulder of the characteristic curve at which the gradient equals approximately the average gradient between these minimum and maximum densities. We refer to the exposure range between these two densities as the useful exposure scale or, measured along the usual abscissa axis, as the useful "log exposure scale."

For conventions or systems dependent on "maximum useful densities" higher on the characteristic curve, the low density group increment should be larger, say .06 for "maximum useful densities" just slightly below maximum available densities, but this variation is more of theoretical than practical importance. Even for the "average gradient maximum densities," the value .02 should theoretically vary somewhat with the contrast of the material being tested, but we have found that a value of about .02 is satisfactory in practice even for all the different degrees of contrast available in standard photographic papers.

When sensitometer tablets according to any form of the present invention are used, visual inspection of the resulting sensitometric strip indicates either or both of the points corresponding respectively to the minimum and the maximum useful densities. Below the minimum and above the maximum, the density differences in the strip corresponding to the increments at each step are no longer discernible. The above described increments are such that these density differences are just barely discernible in the steps representing the limits of useful exposures.

A preferred embodiment of the invention is a tablet in which each step is made up of a pair of adjacent densities or density areas differing from each other by the increment required. This permits the density difference from step to step to have any value which may be more or less than the critical increment and is usually more since thereby the number of steps required to cover the whole range is reduced. It is also desirable to have the density difference from step to step, as well as the increment between the two parts of each step, constant. With this feature there is a wide latitude of permissible exposures. The reason for this is discussed in more detail in connection with the drawings.

In the preferred form, each step of the tablet is provided with a number which prints onto the sensitometric strip and the steps are numbered consecutively or at least so that equal increments in the numbers correspond to equal increments in density between the corresponding steps of the tablets. This feature is also preferred in the tablets capable of giving log exposure scale accurately even though the absolute magnitude of the exposure through the tablet is not accurately known.

Another preferred feature consists of having one density area of each pair enclosed in the other. That is, each step consists of an enclosed area on a background or border area, the densities of the two areas differing by the required increment and the periphery of the enclosed area giving the dividing line at which "just discernible density difference" is detected in the resulting strip.

When the sensitometer tablet is to be used in a projection printer or enlarger, any errors due to variations in intensity across the field of the lens system employed, may be avoided or at least minimized by having the steps of the tablet arranged on the circumference of a circle so that all steps are in the same zone of the lens field when the tablet is concentrically oriented on the optic axis of the lens.

Another feature requires the density difference between the minimum density and average density of the tablet including the steps and the area outside the steps to approximate that of any negative or photographic transparency to be printed with the enlarger. In this way any errors or defects caused by flare in the optical system will be the same during actual printing as during the sensitometric tests. For this purpose the density of the area outside the steps is made to have an average value lying somewhere between the densities of the highest and lowest density steps. For printing ordinary pictorial negatives this average density should be about 0.8 above the lowest density step. For printing other types of negatives this average density may have values differing from the lowest step by amounts slightly different from 0.8 but this is of less importance practically.

Occasionally, observers are afraid that they are imagining a density difference in steps beyond the right one and they prefer to have the enclosed areas of the steps of different shapes so that they do not know just what shape to expect in the next step and hence are sure they are not being misled. These shapes may be all quite different one from the other, or may repeat, but not in a periodic manner.

The invention will be apparent and fully understood from the following description when read in connection with the accompanying drawings in which.

Figure 7:
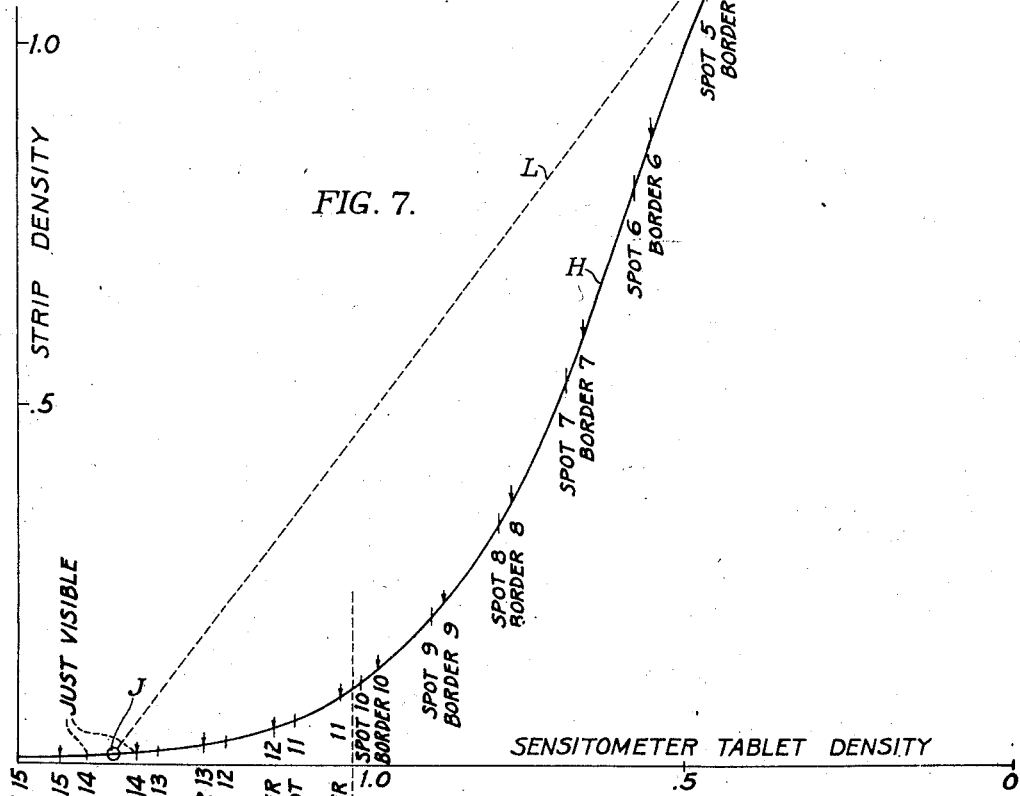
Fig. 7 shows the characteristic curve of the material constituting the strip of Fig. 6.

It is first pointed out that with the present invention it is not necessary to determine the actual densities of the sensitometric strips or to plot a curve such as shown in Fig. 7, but an explanation of the invention and of the theory involved is best explained by reference to such a characteristic curve.

Figure 1:
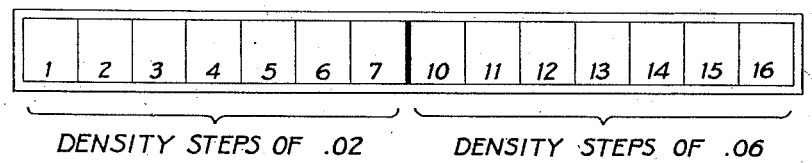
Figs. 1 to 5 illustrate different forms of sensitometer tablets according to the present invention.

In Fig. 1 there is illustrated a sensitometer tablet in which the steps form two groups, those of low density differing from one another by density increments of 0.2 and those of high density similarly differing by increments of .06. The border-lines between adjacent steps in sensitometric strips made through this tablet are utilized as the lines of demarcation at which "just discernible density difference" is measured.

Figure 2:
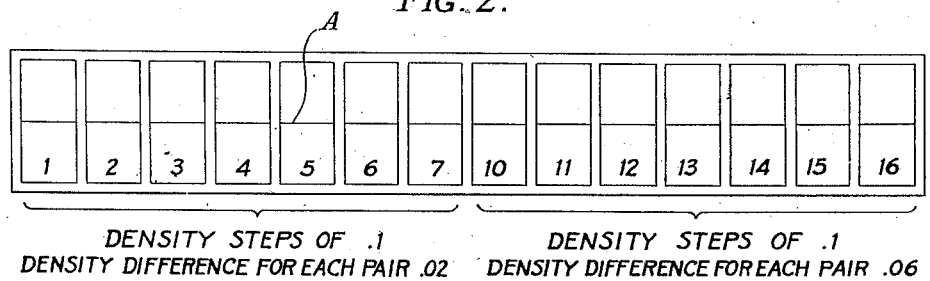

In Fig. 2 each step operates independently and consists of a pair of densities having constant increments of .02 in the low density group and of .06 in the high density group. The steps differ from one another by increments of .1 so that seven steps cover all of the useful low density range and seven other steps cover all of the useful high density group. Such a system has a decided advantage over that illustrated in Fig. 1, since in Fig. 2 the density increment between steps 1 and 11 is exactly the same as that between steps 2 and 12, steps 3 and 13, etc. In both figures, each density area in the high density group is adjacent to one differing therefrom by .06 density unit and each area in the low density group is adjacent to one differing therefrom in density by .02.

Figure 3:
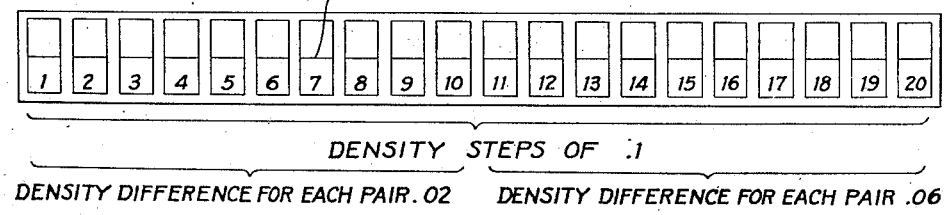

Fig. 3 may be considered as a modification of Fig. 2 in which all of the steps of the tablet are included, but of course in Fig. 2 the increment between step 7 and 10 need not be .3 as it is in Fig. 3. Fig. 2 has the advantages of being a more compact unit but has the disadvantage that the exposure must be accurately controlled to bring the toe of the characteristic curve somewhere between steps 10 and 17 and the shoulder somewhere between steps 1 and 7, whereas Fig. 3 permits somewhat greater latitude in the exposure given. In Figs. 2 and 3 the dividing line A between the pair of densities making up each step corresponds to the line of demarcation at which the just discernible density difference is determined when inspecting the corresponding sensitometric strip.

Figure 4:
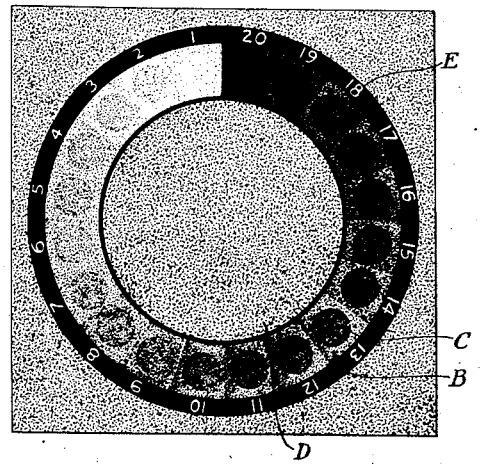

In the enlarged view of a preferred form of the invention shown in Fig. 4, the steps are arranged on the circumference of a circle and the higher density of each pair is in a circular area C on a background B having the corresponding slightly lower density. Such a tablet may be used in a projection printer and when concentrically arranged in the optical system, the zonal distribution of intensity in the lens field has no differential effect on the exposure through the different steps. The area D inside the circle and also the area outside the circle has a uniform density about the same as step 8 so as to simulate the average density of a negative when a print is made, the differences in exposure time taking care of differences in overall density from one negative to another. The numbers E corresponding to each step are printed adjacent thereto and are clear on a dark or opaque background so as to print dark on the sensitometric strip. In steps 1 to 10 of the tablet the increment is only .02 whereas in steps 11 to 20 the increment is .06.

Figure 5:
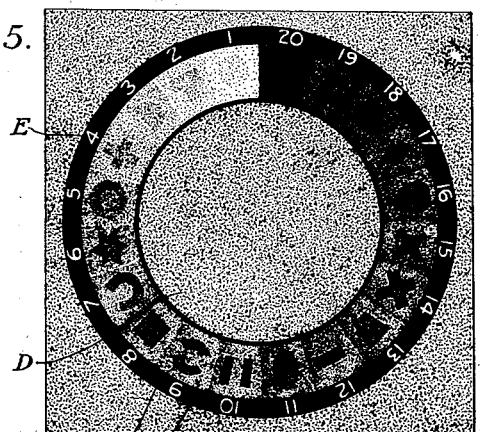

Fig. 5 differs from Fig. 4 merely by using differently shaped areas in each step so that any tendency to imagine the presence of a discernible density difference in a step will be minimized. In either case, the periphery of the high density area in each step corresponds to the line of demarcation at which just discernible density differences are determined.

Figure 6:
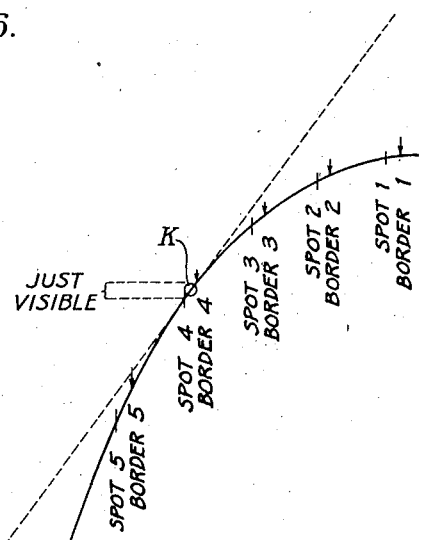
Fig. 6 illustrates a sensitometer strip made by printing through the tablet illustrated in Fig. 4.

Fig. 6 illustrates a sensitometric strip exposed through a tablet such as Fig. 4 but in practice would be enlarged compared to Fig. 4 if printed by an enlarging system. In this Fig. 6 it will be noted that the spots in steps 1, 2, and 3 are completely invisible and step 4 is the first one in which the central spot is discernible. Similarly, it will be noted that steps 16 to 20 are perfectly clear and in step 15 the central spot is of doubtful visibility. In this example, step 14 would be taken as the step of just discernible density difference.

Measurements made by a reflection densitometer on the spot and background of each step of the strip shown in Fig. 6 and plotted against the densities of the tablet illustrated in Fig. 4 results in the characteristic curve H shown in Fig. 7. In this figure the central area of each step is referred to as the spot and the background is referred to as the border. It will be noted that the spots of the sensitometer tablet differ by equal increments of .1 and the borders or grounds differ from the spots by .06 in the dense regions of the tablet (steps 11 to 20) and by .02 in the low density portion of the tablet (steps 1 to 10).

It will be noted by reference to the point J on the curve H that in the low density or toe region of the test material, an increment of .06 in the tablet results in a just discernible density difference at the limit of the useful portion of the toe. Similarly, by reference to the point K on the curve H it will be noted that our selection of .02 as the increment caused the just discernible density difference to fall quite close to the point of the curve at which the gradient approximately equals the average gradient of the curve between the point J and the point K. This means that the line L between the points J and K is tangential to the curve H at the point K. If we wanted to measure some point higher on the curve H, we would have selected a larger density increment than .02 which when multiplied by the gradient at the point at which we wished to make our measurements would give this quality known as the "just discernible density difference."

Sensitometric studies have proven that the exposure scale between the point J and the point K is the most useful one especially with printing paper and it is for this reason that we prefer to make our measurements with reference to this exposure scale defined above as the useful "log exposure scale." The slope of the line L joining these two points is the average gradient over this range and is also the gradient at the point K. Since the points J and K are determined by visual inspection, (in the example, steps 14 and 4 thus selected correspond respectively to these points) this visual examination gives the useful exposure scale directly, namely, ten units of the sensitometric tablet or more specifically a range of 1.0 unit of density or log exposure.

If with this preferred embodiment (Fig. 4) somewhat less exposure had been given, the just discernible spot might have been on step 2 say. However, by having the increments between steps constane over both the high and the low density steps of the tablet, the other just discernible difference would have fallen on step 12 instead of step 14 and thus the log exposure scale would have again been 1.0 unit of log exposure scale or 10 steps of the tablet even though the exposure was not accurately controlled.

If the exposure through the sensitometer tablet is accurately controlled or at least known, speed measurements relative to the exposure given are also made by this direct visual examination. For example, if speed is to be determined with reference to the joint J, it is known as soon as it is noted that the point J falls on the step 14 in the particular sample illustrated. Conversion to "minimum useful density" speeds would be direct when the intensity and time of exposure in the sensitometer were taken into account.

In connection with photographic paper on the other hand, we prefer to measure speed in terms of the point K which is that point on the shoulder of the curve at which the gradient equals the average gradient over the log exposure scale from J to K. Our preference here is based on our observation of the universal tendency to accept as best, only those prints which utilize a range terminating near this point K. Since the point K is determined approximately by direct inspection, our tablets permit direct measurement of this "speed," the time and intensity of exposure being taken into account as before. Actually, the points J and K were selected as criteria by comparison of practical exposure scales and speeds with the characteristic curve and the preferred form of sensitometer tablet was then developed to give these points J and K directly in terms of the steps in which there is a just discernible density difference. The above discussed increments of .06 and .02 give this result but need be only approximately these particular values.

The reason for measuring log exposure scale is apparent from the following. It is well known that the log exposure scale of a photographic paper is an aid in determining what negatives can be printed successfully on it. A negative having both very high and very low densities will usually require a paper having a large "log exposure scale" to accommodate this range of densities. In general this is compatible with the tone reproduction requirement that a contrasty negative requires a soft or flat paper. The fact that most papers have about the same maximum useful density means that higher contrast papers usually have shorter log exposure scales.

It need not be assumed that the log exposure scale of the paper should always be matched exactly to the density scale of the negative. The best relation between these two quantities has been determined by statistical psycho-physical methods and it has been found that the best relationship is very nearly a simple proportionality. The log exposure scale is, therefore, useful in making prints by sensitometric control and the present invention provides a means of measuring it.

For example, a given type of paper is exposed through a tablet according to the invention and after processing the critical steps are found to be numbers 2 and 15 say. Without even knowing the exposure time, the observer is thus informed that the log exposure scale is 13 steps or 1.3 density units. This paper is thus known to be suitable for negatives requiring this range, and roughly speaking such negatives would be those having a density range from minimum to maximum of about 1.3. However, due to tone reproduction requirements even better results are often obtained by using a paper just slightly more contrasty than indicated by the density range. Thus the negatives with a density range as great as 1.5 or 1.6 can be printed successfully on a paper having a log exposure scale of 1.3, the extreme highlights and/or shadows being sacrificed to gain a higher contrast nearer the value indicated for one to one tone reproduction.

Furthermore, if the minimum density of the negative or, more exactly, whatever shadow density is to be printed at the speed point on the paper curve is the same as step 2, the exposure through the negative should be the same as was given the test strip. Twice this exposure is required if the minimum negative density is greater than that of step 2 by 0.3 and so forth, the logarithmic relationship being taken into account. Thus, in addition to being the most useful criteria for comparing paper exposure scales and speeds, this log exposure scale and the maximum useful density speeds are particularly valuable when the maximum and minimum negative densities are known. A more complete description of this particular application of data gained by using the present invention is described in "The control of photographic printing by measured characteristics of the negative" by Jones and Nelson, Journal of the Optical Society of America, October 1942, volume 32, page 558.

Having thus described various preferred embodiments of our invention and the underlying principle thereof, we wish to point out that it is not limited to the structures shown but is of the scope of the appended claims.

What we claim and desire to secure by Letters Patent of the United States is:

1. A sensitometer tablet comprising density steps ranging from high densities to low densities, with a plurality of steps in a high density group and a plurality of steps in a low density group, each step including at least one density area, said one density area in each density step in the high density group being adjacent to a density area differing therefrom by approximately .06 density unit and said one density area in each density step in the low density group being adjacent to a density area differing therefrom by approximately .02 density unit.

2. A sensitometer tablet according to claim 1 in which the steps are numbered, the numbers being printable with the tablet, and equal increments in the numbers correspond approximately to equal increments in density between the corresponding steps of the tablet.

3. A sensitometer tablet comprising density steps ranging from high to low densities, in which each step consists of a pair of adjacent density areas one substantially surrounding the other differing from each other by a small increment of density which is constant from step to step at least over part of the tablet and in which the density difference between corresponding areas of successive steps is greater than twice said small increment.

4. A sensitometer tablet comprising density steps ranging from high to low densities with a plurality of steps in a low density group and a plurality of steps in a high density group, in which each step consists of a pair of adjacent density areas differing from each other by a small increment of density which is greater in the high density group than in the low density group and in each group is constant from step to step.

5. A sensitometer tablet comprising density steps ranging from high to low densities, in which each step consists of a pair of adjacent density areas differing from each other by a small increment of density which in the high density steps is approximately .06 and approximately constant from step to step and in the low density steps is approximately .02 and approximately constant from step to step.

6. A sensitometer tablet comprising density steps ranging from high to low densities with a plurality of steps in a low density group and a plurality of steps in a high density group, in which each step includes an enclosed area on the background area, the densities of the two areas in each step differing by a small increment of density which is approximately constant from step to step for several successive steps in the low density group and which is approximately constant from step to step for several successive steps in the high density group and which has a different value in one group than in the other.

7. A sensitometer tablet according to claim 6 in which the low density group constant is about .02 and the high density group constant is about .06.

8. A sensitometer tablet according to claim 1 in which the steps are arranged on the circumference of a circle.

9. A sensitometer tablet according to claim 3 in which the steps are arranged on the circumference of a circle.

10. A sensitometer tablet according to claim 6 in which the steps are arranged on the circumference of a circle.

11. A sensitometer tablet according to claim 1 including an area outside the steps which has an average density about 0.8 above the density of the lowest density step.

12. A sensitometer tablet according to claim 3 including an area outside the steps which has an average density about 0.8 above the density of the lowest density step.

13. A sensitometer tablet according to claim 6 including an area outside the steps which has an average density about 0.8 above the density of the lowest density step.

14. A sensitometer tablet according to claim 1 in which the steps are arranged on the circumference of a circle and the area inside the ring of steps is integral with the steps and has a uniform density about 0.8 above the density of the lowest density step.

15. A sensitometer tablet according to claim 6 in which the steps are arranged on the circumference of a circle and the area inside the ring of steps is integral with the steps and has a uniform density about 0.8 above the density of the lowest density steps.

16. A sensitometer tablet according to claim 6 in which the shape of the enclosed area changes in a non-periodic manner from step to step.

LOYD A. JONES.
CLARENCE N. NELSON.
LAWRENCE D. CLARK.